G. M. HUSTON.
VEHICLE SPRING.
APPLICATION FILED AUG. 7, 1912.
1,049,097.
Patented Dec. 31, 1912.
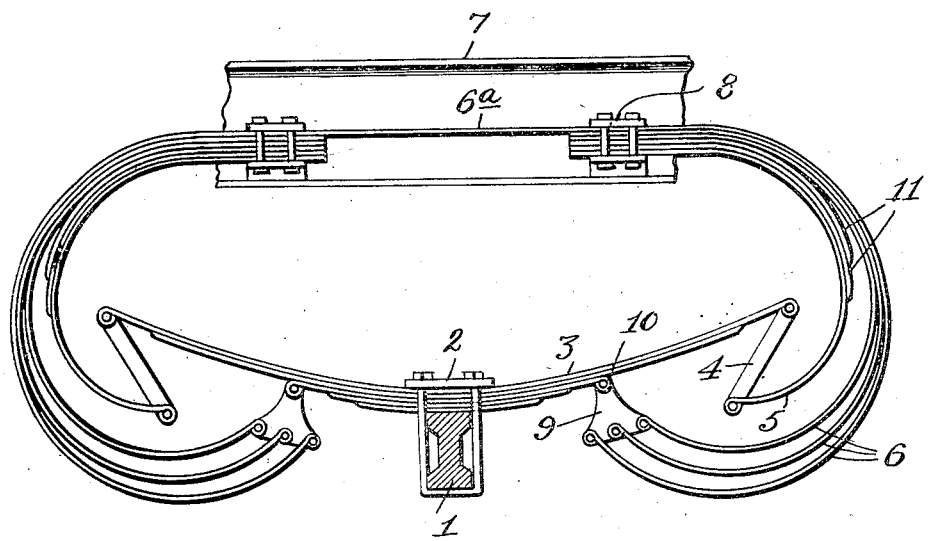

UNITED STATES PATENT OFFICE.

GEORGE M. HUSTON, OF NEW YORK, N. Y.

VEHICLE-SPRING.

1,049,097.

Specification of Letters Patent.

Patented Dec. 31, 1912.

Application filed August 7, 1912. Serial No. 713,827.

*To all whom it may concern:*

Be it known that I, GEORGE M. HUSTON, a citizen of the United States, residing at New York city, in the State of New York, have invented a new and useful Improvement in Vehicle-Springs, of which the following is a specification.

My invention relates to vehicle springs, and has for its object certain improvements in the construction disclosed in Letters Patent, No. 1,036,247, granted to me August 20, 1912, as will be hereinafter more particularly described and claimed, reference being had to the accompanying drawing, in which: the figure is a side elevation of my improved construction shown applied to a vehicle axle and body, said axle being shown in section.

In the said drawing the reference numeral 1 denotes one of the axles of an automobile or other vehicle, the same being shown I-shaped in cross section, though it may be of any configuration. Bolted to the top of said axle at 2 is a leaf spring 3 of a construction now commonly used in automobiles and formed of any desired number of leaves. Said spring is at its outer end connected, by a shackle 4, with the free end of the innermost leaf 5 of a series of spring leaves 6. Said spring leaves are conjointly connected to the vehicle body 7 at a point 8 and extend downwardly therefrom in the arcs of circles to a shackle 9 to which they are separately pivoted in spaced relation, said shackle being pivoted at 10 to the free end of one of the shorter leaves of leaf spring 3, said leaf being suitably shaped for that purpose. The spring leaves 6 are so connected to said shackle, as shown, that the center leaf is practically unaffected by any movement of said shackle on its pivot 10, due to relative movement of the axle 1 and the body 7, whereas the outermost leaf will be drawn toward the center leaf to increase their area of contact, and the innermost leaf will be simultaneously forced or pushed toward said center leaf with the same result.

I prefer to interpose between the innermost leaf 5 and the leaves 6 a series of supplemental short spring leaves 11, whose function is to strengthen the resilience of spring leaf 5 under tension.

In operation, when the axle 1 and body 7 move toward each other the down pull exerted by the spring leaves 6 on shackle 9 will cause the latter to turn on its pivot 10 as described in my patent hereinbefore referred to, which movement, while it will but slightly affect the center leaf, will pull the outermost leaf and will push the innermost into a greater area of contact with the center leaf. At the same time the down thrust of spring leaf 5 will through shackle 4, draw down the outer end of leaf spring 3, the device as a whole operating most effectively not only as a spring but also as a shock absorber, and operating to offer a powerful resistance to shocks.

I have shown the device applied to both ends of the leaf spring 3 and connected at the points 8 to the vehicle body, the two sections being connected at 6ª for transportation purposes by the extension of one only of the leaves of the spring leaf, as in my Letters Patent No. 1,032,235, granted July 9, 1912. I may, however, apply said device to one side only of the leaf spring 3, as shown in Fig. 2 of my Letters Patent No. 1,032,235, hereinbefore referred to.

Having thus described my invention, what I claim as new and desire to secure by Letters Patent is:—

1. A spring construction for vehicles, embodying a leaf spring attached to one member, a spring leaf attached at one end to the other member and at its other end to said leaf spring intermediate the length of the latter, and a supplemental spring leaf similarly attached to said other member and at its free end attached to the free end of said leaf spring.

2. A spring construction for vehicles, embodying a leaf spring attached to one member, and a plurality of similarly curved spring leaves fixed to the other member in contact with each other and gradually separating toward their opposite ends, said opposite ends being connected to said leaf spring intermediate the length of the latter.

3. A spring construction for vehicles, embodying a leaf spring attached to one member, a plurality of similarly curved spring leaves fixed to the other member in contact with each other and gradually separating toward their opposite ends, said opposite ends being connected to said leaf spring intermediate the length of the latter, and a supplemental spring leaf fixed to said other member in contact with said spring leaves and connected at its free end with the free end of the leaf spring.

4. A spring construction for vehicles, embodying a leaf spring attached to one member, a plurality of similarly curved spring leaves fixed to the other member in contact with each other and gradually separating toward their opposite ends, and a shackle connecting the free ends of said spring leaves with said leaf spring intermediate the length of the latter.

5. A spring construction for vehicles, embodying a leaf spring attached to one member, a plurality of similarly curved spring leaves fixed to the other member in contact with each other and gradually separating toward their opposite ends, a shackle connecting the free ends of said spring leaves with said leaf spring intermediate the length of the latter, and a supplemental spring leaf attached to said other member with said similarly curved spring leaves and connected at its free end with the free end of the leaf spring.

In testimony whereof I have hereunto set my hand in the presence of two subscribing witnesses.

GEORGE M. HUSTON.

Witnesses:
 LEWIS A. HUSTON,
 J. N. FORT, Jr.

---

Copies of this patent may be obtained for five cents each, by addressing the "Commissioner of Patents, Washington, D. C."